(12) United States Patent
Kardos et al.

(10) Patent No.: US 11,578,641 B2
(45) Date of Patent: Feb. 14, 2023

(54) THERMOSTAT DEVICE FOR A COOLING SYSTEM AND A COOLING SYSTEM COMPRISING SAID THERMOSTAT DEVICE

(71) Applicant: Scania CV AB, Södertälje (SE)

(72) Inventors: Zoltan Kardos, Södertälje (SE); Ola Hall, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/977,850

(22) PCT Filed: Mar. 14, 2018

(86) PCT No.: PCT/SE2018/050248
§ 371 (c)(1),
(2) Date: Sep. 3, 2020

(87) PCT Pub. No.: WO2019/177504
PCT Pub. Date: Sep. 19, 2019

(65) Prior Publication Data
US 2021/0025315 A1 Jan. 28, 2021

(51) Int. Cl.
*F01P 7/16* (2006.01)
*F01P 3/20* (2006.01)
(Continued)

(52) U.S. Cl.
CPC .............. *F01P 7/16* (2013.01); *F01P 3/20* (2013.01); *G05D 23/1852* (2013.01);
(Continued)

(58) Field of Classification Search
CPC .......... F01P 7/16; F01P 3/20; F01P 2007/146; F01P 2025/08; F01P 2060/06; G05D 23/1852
See application file for complete search history.

(56) References Cited

U.S. PATENT DOCUMENTS 2,606,539 A * 8/1952 Field, Jr. ................... F01P 5/14
137/506
5,960,872 A 10/1999 Huemer et al. ............... 165/298
(Continued)

FOREIGN PATENT DOCUMENTS

DE 29 23 523 A1 12/1980
DE 41 22 256 A1 8/1992
(Continued)

OTHER PUBLICATIONS

International Search Report dated Oct. 31, 2018 in corresponding PCT International Application No. PCT/SE2018/050248.
(Continued)

*Primary Examiner* — Kurt Philip Liethen
(74) *Attorney, Agent, or Firm* — Banner & Witcoff, Ltd.

(57) ABSTRACT

A thermostat device (8) for a cooling system in a vehicle. The device (8) includes a thermostat housing (15) enclosing a movably arranged valve body (16, 20, 34, 44). The valve body is configured to distribute coolant from a thermostat chamber (15a) to a radiator bypass line (9) and/or a radiator (11) in dependence on the position of the valve body. The device (8) has a first thermal expansion element (31) providing a first stroke of a valve body (16, 20, 34, 44) in response to the temperature of the coolant in a the pilot chamber (14a), and a second thermal expansion element (32) providing a second stroke of the valve body (16, 20, 34, 44) in response to the temperature of the coolant in the thermostat chamber (15a) such that the valve body (16, 20, 34, 44) is moved to a position defined by the strokes from the thermal expansion elements (31, 32). The pilot chamber (14a) has an outlet passage (14b) for directing coolant from the pilot chamber (14a) to the thermostat chamber (15a).

17 Claims, 4 Drawing Sheets

(51) Int. Cl.
*G05D 23/185* (2006.01)
*F01P 7/14* (2006.01)

(52) U.S. Cl.
CPC ..... *F01P 2007/146* (2013.01); *F01P 2025/08* (2013.01); *F01P 2060/06* (2013.01)

(56) References Cited

U.S. PATENT DOCUMENTS

| | | | |
|---|---|---|---|
| 6,161,767 A * | 12/2000 | Yeo | F02D 41/221 |
| | | | 236/94 |
| 6,592,046 B2 | 7/2003 | Suda | 236/34.5 |
| 2003/0136357 A1* | 7/2003 | Kobayashi | F01P 7/167 |
| | | | 123/41.08 |
| 2010/0126598 A1* | 5/2010 | Peric | F16K 3/26 |
| | | | 137/625.48 |
| 2010/0175640 A1 | 7/2010 | Sheppard | |
| 2013/0112763 A1* | 5/2013 | Roman | F16K 31/002 |
| | | | 236/101 R |
| 2014/0326443 A1* | 11/2014 | Kardos | F01P 7/165 |
| | | | 165/287 |
| 2016/0109890 A1 | 4/2016 | Styron et al. | |
| 2017/0114702 A1* | 4/2017 | Okita | F01P 11/04 |
| 2017/0114707 A1* | 4/2017 | Okita | F01P 3/18 |
| 2017/0276056 A1* | 9/2017 | Spenny | F01P 7/16 |
| 2018/0017155 A1* | 1/2018 | Gooden | F01M 5/002 |

FOREIGN PATENT DOCUMENTS

| | | |
|---|---|---|
| EP | 0 150 429 A2 | 8/1985 |
| EP | 2 037 097 A2 | 3/2009 |
| GB | 2476073 A | 6/2011 |
| JP | 2004-293309 A | 10/2004 |
| JP | 2012-021492 A | 2/2012 |
| JP | 2014-163303 A | 9/2014 |
| JP | 6002309 B1 | 10/2016 |
| JP | 2017-008753 A | 1/2017 |
| SE | 532 354 C2 | 12/2009 |
| WO | WO 2013/151486 A1 | 10/2013 |
| WO | WO 2014/098709 A1 | 6/2014 |

OTHER PUBLICATIONS

Written Opinion dated Oct. 31, 2018 in corresponding PCT International Application No. PCT/SE2018/050248.
European Search Report, dated Jul. 26, 2021, issued in corresponding European Patent Application No. 18909336.2. Total 6 pages.
Oct. 8, 2021—(CN) Office Action—App. No. 201880090748.1.
May 7, 2022—(CN) Second Office Action—App. No. 201880090748.1.
Sep. 2, 20220—(BR) Preliminary Office Action—App. No. BR 11 2020 017411 4.

* cited by examiner

THERMOSTAT DEVICE FOR A COOLING SYSTEM AND A COOLING SYSTEM COMPRISING SAID THERMOSTAT DEVICE

CROSS-REFERENCE TO RELATED APPLICATIONS

The present application is a 35 U.S.C. §§ 371 national phase conversion of PCT/SE2018/050248, filed Mar. 14, 2018, the contents of which are incorporated herein by reference The PCT International Application was published in the English language.

BACKGROUND OF THE INVENTION AND PRIOR ART

The present invention relates to a thermostat device for a cooling system.

Heavy vehicles are often equipped with a supplementary brake in the form of a hydraulic retarder. In a conventional hydraulic retarder, an oil is used as working medium. When the retarder is activated, the oil is rapidly heated in the retarder. The oil leaving the retarder is cooled in a retarder cooler by coolant circulating in the cooling system of the vehicle. In another kind of hydraulic retarder, the coolant is used as working medium. In this case, the temperature of the coolant in the cooling system rises even more rapidly when the retarder is activated.

A conventional cooling system comprises a thermostat sensing the temperature of the coolant in a position upstream of a radiator. The thermostat directs the coolant to the combustion engine without cooling in the radiator when the coolant has a lower temperature than a regulating temperature of the thermostat, and to the radiator for cooling when the coolant has a higher temperature than the regulating temperature. The radiator is a component of the cooling system in which the temperature of the coolant can change rapidly. In a conventional cooling system it takes a certain period of time before the cooled coolant from the radiator reaches the thermostat. The ability of the cooling system to react rapidly to temperature changes of the coolant in the radiator is, therefore, low. The slow feedback may lead to what is known as "temperature cycling", in which the thermostat switches between an open and a closed position during a relatively long period of time. As a consequence, the radiator may be frequently exposed to large changes in temperature, leading to a shorter lifetime.

SE 532 354 shows a cooling system with a thermostat sensing the temperature of the coolant in a pilot circuit. The pilot circuit receives a small part of the coolant flow from an inlet line to the combustion engine. In this case, the thermostat senses the temperature of the coolant just after it has been cooled in the radiator. Thus, a considerably faster feedback is obtained when the coolant undergoes rapid changes in temperature in the cooler. The problem of temperature cycling can be essentially avoided with the aid of such a pilot circuit.

SUMMARY OF THE INVENTION

The object of the present invention is to provide a thermostat device which is compact and includes few components at the same time as it has capacity to distribute the coolant flow to a radiator and a radiator bypass line in view of the temperature of the coolant in two positions of the cooling system.

The thermostat device comprises a pilot chamber receiving a small coolant flow from a first position of the cooling system and a thermostat chamber receiving coolant from a second position of the cooling system. A valve body distributes the coolant in a thermostat chamber to the radiator or a radiator bypass line. The thermostat device comprises a first thermal expansion element which is arranged in the pilot chamber. The first thermal expansion element provides a first stroke of the valve body in response to the coolant temperature in the pilot chamber. The thermostatic device comprises a second thermal expansion element which is arranged in the thermostat chamber. The second thermal expansion element provides a second stroke of the valve body in response to the coolant temperature in the thermostat chamber. In this case, the distribution of coolant to the radiator and the radiator bypass line is determined by a common valve body which is controlled by the temperature of the coolant in two different positions of the cooling system. Temperature changes of the coolant in said two positions in the cooling system can be rapidly indicated and followed by a correspondingly rapid regulation of the position of the valve body. The use of two thermal expansion elements and a common valve body results in a compact design including few components.

Furthermore, the coolant is directed from the pilot chamber, via an outlet passage, to the thermostat chamber. It is to be noted that the coolant flow from the pilot chamber to the thermostat chamber is significantly smaller than the ordinary coolant flow to the thermostat chamber. In view of this fact, the coolant flow from the pilot chamber to the thermostat chamber has substantially no influence on the coolant temperature in the thermostat chamber which is sensed by the second thermal expansion element. Preferably, the pilot chamber is arranged in the vicinity of the thermostat chamber. A wall element may be arranged between said chambers. In this case, the pilot chamber outlet passage may be a through hole in said wall. In any event, the existence of a pilot chamber outlet passage directing coolant to the thermostat chamber eliminates the need for a separate return line for the pilot circuit. Thus, the included components of the thermostat device can be further reduced. However, in a condition for directing a coolant flow from the pilot chamber to the thermostat chamber, it is that the pilot chamber receives coolant from a first position in the cooling system in which the coolant has a higher pressure than in the second position in which the ordinary coolant entering the thermostat chamber. The pilot circuit may receive coolant from a first position located immediately downstream of a pump circulating coolant through the cooling system.

According to an embodiment of the invention, each thermal expansion element comprises a sensor member configured to sense the temperature of the coolant and a stroke member configured to provide said stroke of the valve body. Such thermal expansion elements are able to provide a stroke of the valve body in dependence on the temperatures of the coolant. The sensor member of one of the thermal expansion elements may be stationary arranged in the thermostat device and the stroke member of said stationary expansion element may be connected to a part of the other thermal expansion element. Such a stationary thermal expansion element is able to provide a stroke of the movably arranged thermal expansion element together with the valve body.

According to an embodiment of the invention, the stroke member of the stationary arranged thermal expansion element is connected to the stroke member of the movably arranged thermal expansion element and the sensor member of the movably arranged thermal expansion element is connected to the valve body. Since the stroke members of the thermal expansion element are connected to each other, they can be activated in opposite directions. The sum of the strokes defines the position of the valve body. Alternatively, it is possible to use a common stroke member for the two thermal expansion elements. Such a design reduces further the number of components used in the thermostat device.

According to an embodiment of the invention, the stroke member of the stationary arranged thermal expansion element is connected to the sensor member of the movably arranged thermal expansion element and the stroke member of the movably arranged thermal expansion element is connected to the valve body. In this case, the stroke members of the thermal expansion elements can be activated in the same direction. Also in this case, the sum of the strokes defines the position of the valve body. The stroke member of the stationary arranged thermal expansion element may be connected to the sensor member of the movably arranged thermal expansion element via a connection member. Such a connection member may provide a stable connection between the stroke members of the stationary arranged thermal expansion element and the sensor member of the movably arranged thermal expansion element.

According to an embodiment of the invention, each of the thermal expansion elements comprises a sensor member in the form of a capsule enclosing a material body changing phase at a specific temperature and a stroke member in the form of a piston configured to provide said stroke of the valve body when said material body changes phase. The individual thermal expansion elements may have a conventional design. Such thermal expansion elements are inexpensive and they have a reliable function. The material bodies may be wax material having suitable phase changing temperatures.

According to an embodiment of the invention, the valve body is movably arranged between a first end position in which it directs the entire coolant flow to the radiator bypass line, a second end position in which it directs the entire coolant flow to the radiator and at least one intermediate position in which it directs a part of the coolant flow to the radiator bypass line and a remaining part of the coolant flow to the radiator. During operation conditions when one of the thermal expansion elements provides a stroke, the valve body may be moved to the intermediate position. During operation conditions when both thermal expansion elements provides a stroke, the valve body may be moved to the second end position. The strokes of the thermal expansion elements may be of the same length or of different length. The thermostat device may comprise a valve spring configured to move the valve body towards the first end position.

According to an embodiment of the invention, the thermostat device comprises a movable valve unit including two valve bodies in the form of a first valve plate configured to regulate the coolant flow to the radiator and a second valve plate configured to regulate the coolant flow to the radiator bypass line. In the first end position of the valve unit, the first valve plate may close the outlet to the radiator at the same time as the second valve plate exposes the outlet to the radiator bypass line. In the second end position of the valve unit, the first valve plate may expose the outlet to the radiator at the same time as the second valve plate closes the outlet to the radiator bypass line.

According to an embodiment of the invention, the thermostat device comprises a movable valve body in the form of a tubular sleeve having a periphery wall configured to expose or cover the two outlets in view of its position. In this case, the outlets may be arranged in a side wall of the thermostat housing at different height levels.

The cooling system, includes a thermostat device. The cooling system may be used to cool a combustion engine and a temporarily activated object. The temporarily activated object may be a hydraulic retarder or a retarder cooler for a hydraulic retarder. A hydraulic retarder may rapidly increase the temperature of the coolant in the cooling system when it is activated.

BRIEF DESCRIPTION OF THE DRAWINGS

In the following, preferred embodiments of the invention are described, as examples, with reference to the attached drawings, in which.

DETAILED DESCRIPTION OF PREFERRED EMBODIMENTS OF THE INVENTION

Figure 1:
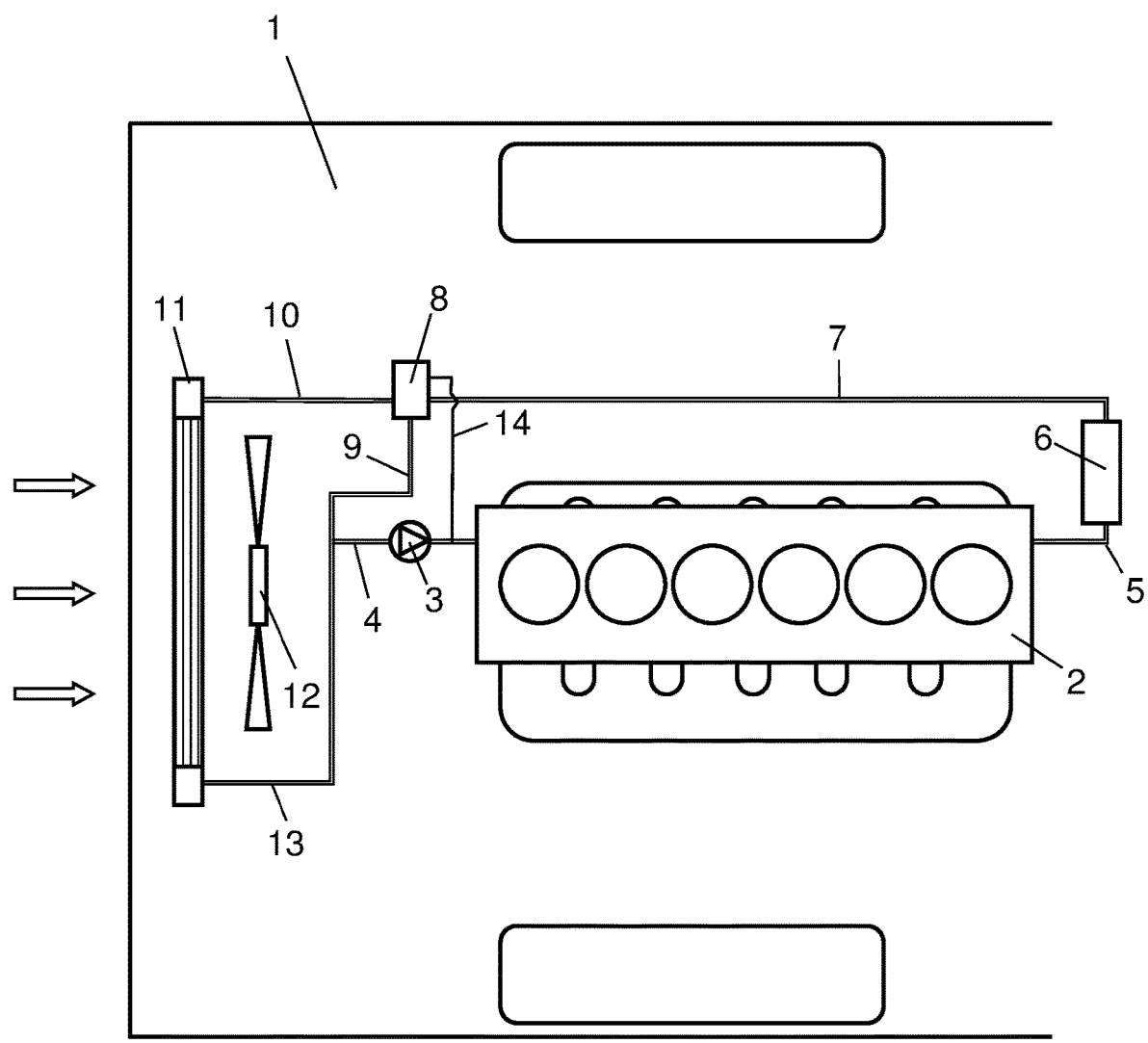
FIG. 1 shows a cooling system comprising a thermostat device according to the invention.

FIG. 1 shows a cooling system cooling a combustion engine 2 in a schematically indicated vehicle 1. The coolant is circulated in the cooling system by means of a coolant pump 3 that is arranged in an engine inlet line 4 directing coolant to the combustion engine 1. After the coolant has passed through the combustion engine 1 it is directed, through an engine outlet line 5, to a further object that can be activated intermittently in the form of a hydraulic retarder 6. Thus the cooling system is used for the cooling of a further object, in addition to the combustion engine 1. In this case, the retarder 6 is a hydraulic retarder using coolant as working medium. Alternatively, a working medium in the form of an oil may be used in the hydraulic retarder. In such a case, the coolant cools the working medium in a retarder cooler. The coolant is directed from the retarder 6, via a retarder outlet line 7, to a thermostat device 8. Depending on the temperature of the coolant, the thermostat device 8 directs the coolant to a radiator bypass line 9 and/or, via a radiator inlet line 10, to a radiator 11. The radiator bypass line 9 directs the coolant back to the engine inlet line 4 and the coolant pump 3. The radiator 11 is arranged at a front portion of the vehicle 1. Other coolers such as a charge air cooler may be arranged in front of the radiator 11. A cooling fan 12 forces a cooling air stream through the radiator 11 such that the coolant undergoes an effective cooling. After the coolant has been cooled in the radiator 11, it is directed, via a return line 13, back to the engine inlet line 4 and the coolant pump 3. A pilot circuit 14 directs a pilot flow, from a position downstream of the pump 3 and upstream of the combustion engine 2, to the thermostat device 8.

Figure 2:
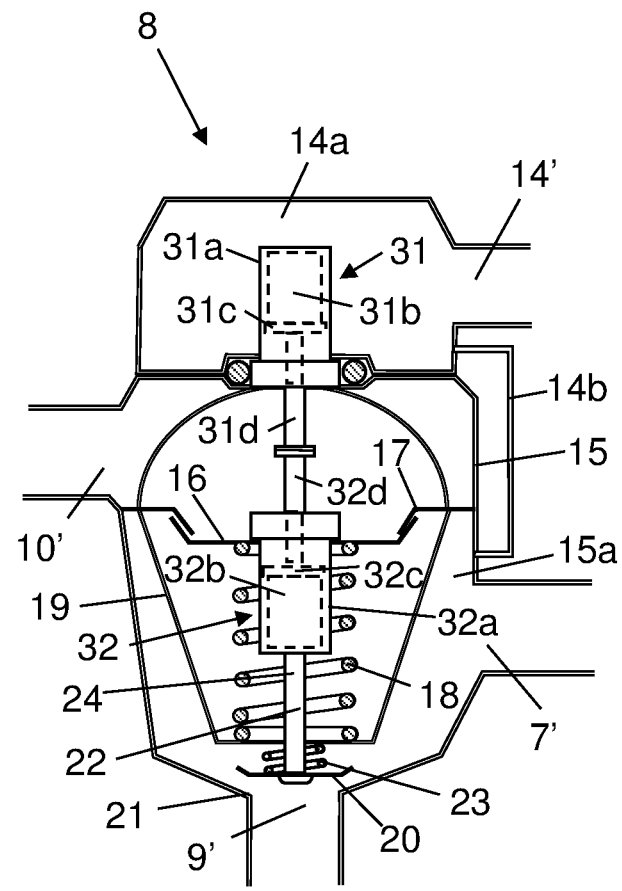
FIG. 2 shows a thermostat device system according to a first embodiment of the invention.

FIG. 2 shows an embodiment of the thermostat device 8. The thermostat device 8 comprises a pilot chamber 14a receiving coolant via the pilot circuit 14. The thermostat device 8 comprises a thermostat housing 15 comprising a thermostat chamber 15a receiving coolant, via an inlet 7', from the retarder outlet line 7. A first outlet 9' directs coolant from the thermostat chamber 15a to the radiator bypass line 9 and a second outlet 10' directs coolant from the thermostat chamber 15a, via the radiator inlet line 10, to the radiator 11. The thermostat device 8 comprises a first valve plate 16 which is movably arranged in relation to a first valve seat 17 between a closed position and an open position. A first valve spring 18 is arranged between the first valve plate 16 and a stationary valve portion 19 in a manner such that the first valve plate 16 is moved against the first valve seat 17 by the valve spring 18.

The thermostat device 8 comprises a second valve plate 20 which is movably arranged in relation to a second valve seat 21 between a closed position and an open position. The second valve seat 21 is defined by the first outlet 9'. The second valve plate 20 is attached to an end of a rod element 22. A second valve spring 23 is arranged between the stationary valve portion 19 and the second valve plate 20. The first valve body 17, the second valve plate 20 and the elongated element 22 are included in a movably arranged valve unit 24 including the first valve plate 16 and the second valve plate 20. The first valve spring 18 tends to move the movable valve unit 24 to a first end position in which the first valve plate 16 closes the opening in the valve seat 17 and thus preventing a coolant flow via the second outlet 10' to the radiator 11. At the same time, the second valve plate 20 exposes the opening in the second valve seat 21 and thus allowing a coolant flow via the first outlet 9' to the radiator bypass line 9.

The thermostat device 8 comprises a first thermal expansion element 31. The first thermostat expansion element 31 comprises a first sensor member in the form of a first capsule 31a fixedly arranged in thermal contact with the coolant in the pilot chamber 14a. The first capsule 31a comprises a closed compartment that is occupied by a first material body 31b. A flexible membrane 31c is arranged between the first material body 31b and an end of a first stroke member in the form of a first piston 31d. The first material body 31b has the property that it increases in volume when it melts and passes into liquid phase. The first material body 31b changes phase at a first temperature $T_1$.

The thermostat device 8 comprises a second thermal expansion element 32. The second thermostat expansion element 32 comprises a second sensor member in the form of a second capsule 32a which is arranged in thermal contact with the coolant in the thermostat chamber 15a. The capsule 32a of the second thermostat expansion element 32 is fixedly arranged on the first valve plate 16. Thus, the second thermostat expansion element 32 is a part of the movable valve unit 24. The second capsule 32a comprises a closed compartment that is occupied by a second material body 32b. A flexible membrane 32c is arranged between the second material body 32b and an end of a second stroke member in the form of a second piston 32d. The second material body 32b has the property that it increases in volume when it melts and passes into liquid phase. The second material body 32b changes phase at a second temperature $T_2$. The second capsule 32a is arranged in a thermostat chamber 8 in thermal contact with the coolant received from the retarder outlet line 7. In this case, the free ends of the pistons 31d, 32d of the first thermostat expansion element 31 and the second thermostat expansion element 32 are fixedly connected to each other.

The pilot chamber 14a comprises an outlet passage 14b in the form of a outlet line directing coolant from the pilot chamber 14a to the thermostat chamber 15a. It is to be noted that the coolant flow from the pilot chamber 14a to the thermostat chamber 15a is significantly smaller than the ordinary coolant flow to the thermostat chamber 15a. Thus, the coolant flow from the pilot chamber 14a does not substantially influence the coolant temperature in the thermostat chamber 15a. The existence of said outlet passage 14b eliminates the need of a separate return line in the pilot circuit 14.

During operation of the combustion engine 2, the coolant is circulated through the cooling circuit by means of the coolant pump 3. The first capsule 31a is in thermal contact with coolant flowing entering the pilot chamber 14a and the second capsule 32a is in thermal contact with the coolant entering the thermostat chamber 15a. As a result, the thermostat device 8 is controlled by the temperature of the coolant in two positions of the cooling system namely in a position downstream of the radiator 11 and in a position downstream of the retarder 6. During operating conditions when the coolant in the pilot chamber 14a has a lower temperature than the first phase changing temperature $T_1$ and the coolant in the thermostat chamber 15a has a lower temperature than the second phase changing temperature $T_2$, the first material body 31b as well as the second material body 32b are in solid phase. Thus, none of the material bodies 31b, 32b is in an expanded state. Consequently, the movable valve unit 24 is maintained in the first end position, which is shown in FIG. 2. In the first end position, the first valve plate 16 is in a closed position in relation to the first valve seat 17 and the second valve plate 20 is in a fully open position in relation to the second valve seat 21. When the valve unit 24 is in this first end position there is no cooling demand of the coolant, the entire coolant flow entering the thermostat chamber 15a from the retarder outlet line 7 is directed to the radiator bypass line 9.

During operating conditions when the coolant in the pilot chamber 14a has a higher temperature than the first phase changing temperature $T_1$ and the coolant in the thermostat chamber 15a has a lower temperature than the second phase changing temperature $T_2$, the first material body 31b is in liquid phase and the second material body 32b is in solid phase. Thus, the first material body 31b is in an expanded state. During expansion of the first material body 31b, it provides a stroke, via the flexible membrane 31c and the piston 31d, to the valve unit 24. The valve unit 24 is moved downwardly from the first end position to an intermediate position, in which the first valve plate 16 is in a partly open position in relation to the first valve seat 17 and the second valve plate 20 is in a partly open position in relation to the second valve seat 21. When the valve unit 24 is in this intermediate position, a part of the coolant flow entering the thermostat device 8 is directed to the radiator bypass line 9 and a remaining part of the coolant flow is directed to the radiator 11.

During operating conditions when the coolant in the pilot chamber 14a has a lower temperature than the first phase changing temperature $T_1$ and the coolant in the thermostat chamber 15a has a higher temperature than the second phase changing temperature $T_2$, the first material body 31b is in solid phase and the second material body 32b is in liquid phase. Thus, the second material body 32b is in an expanded state. During expansion of the second material body, it provides a stroke, via the flexible membrane 32c and the piston 32d, to the valve unit 24. The valve unit 24 is moved downwardly from the first end position to an intermediate position, in which the first valve plate 16 is in a partly open position in relation to the first valve seat 17 and the second valve plate 20 is in a partly open position in relation to the second valve seat 21. When the valve unit 24 is in this intermediate position, a part of the coolant flow entering the thermostat device 8 is directed to the radiator bypass line 9 and a remaining part of the coolant flow is directed to the radiator 11.

During operating conditions when the coolant in the pilot chamber 14a has a higher temperature than the first phase changing temperature $T_1$ and the coolant in the thermostat chamber 15a has a higher temperature than the second phase changing temperature $T_2$, the first material body 31b as well as the second material body 32b is in liquid phase. Thus, the first material body 31b and second material body 32b are in an expanded state. The first thermal expansion element 31 provides a first stroke of the valve unit 24 from the first end position and the second thermal expansion element 32 provides a second stroke of the valve unit 24. In this case, the valve unit 24 receives a movement from the first end position to a second end positon. In the second end position, the first valve plate 16 is in a fully open position in relation to the first valve seat 17 and the second valve plate 20 is in a closed position in relation to the second valve seat 21. When the valve unit 24 is in this second end position, the entire coolant flow entering the thermostat device 8 is directed to the radiator 11.

In this case, the first thermostat element 31 and the second thermostat element 32 provide strokes via the pistons 31d, 32d in opposite direction in relation to each other. Thus, the distance between the first capsule 31a and the second capsule 32a will increase with the sum of the first stroke and the second stroke. Since the second capsule 32a is a part of the valve unit 24, the valve unit 24 will be moved a corresponding distance from the first end position together with the valve bodies 16, 20. The first thermostat element 31 ensures a fast feedback of the thermostat device 8 when the coolant undergoes rapid temperature changes in the radiator 11. The second thermostat element 32 ensures a fast feedback of the thermostat device 8 when the coolant undergoes rapid temperature changes in the retarder 6. The first material body 31b may have a phase changing temperature of about 89° C. and the second material body 32b may have a phase changing temperature of about 96° C. The material bodies may be wax materials having suitable phase changing temperatures.

Figure 3:
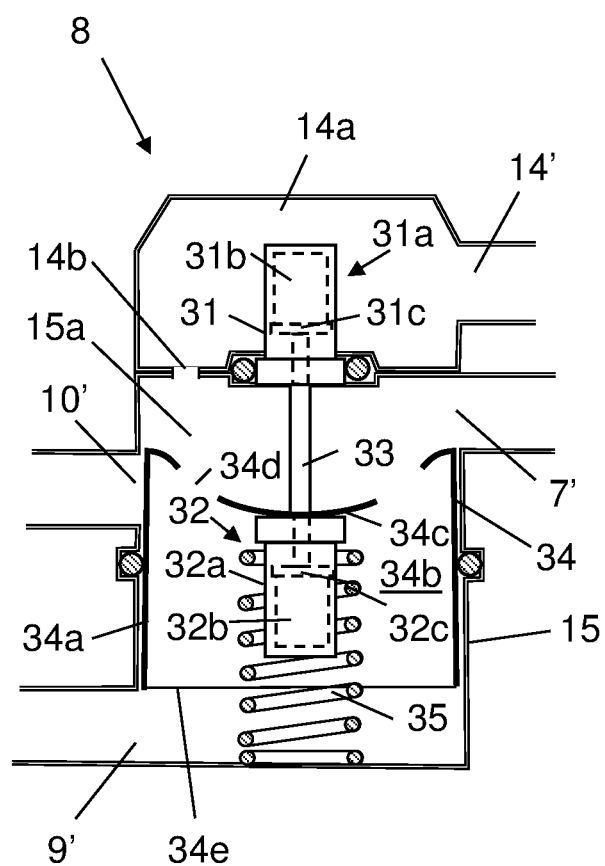
FIG. 3 shows a thermostat device system according to a second embodiment of the invention and FIG. 4 shows a thermostat device system according to a third embodiment of the invention.

FIG. 3 shows an alternative embodiment of the thermostat device 8. In this case, the first thermal expansion element 31 and the second expansion element 32 comprises a common piston 33. Furthermore, the thermostat device 8 comprises a valve body in the form of a tubular sleeve 34. The tubular sleeve 34 comprises a periphery wall 34a defining an inner space 34b, a support portion 34c, a first opening 34d and a second opening 34e. A valve spring 35 is arranged between the support portion 34c and a stationary portion of the valve housing 15 in a manner such that the valve spring 35 acts with a spring force on the tubular sleeve 34 towards a first end position, which is shown in FIG. 3. The tubular sleeve 34 and the second thermostat element 32 form a movable valve unit 36. The remaining components have a design and function as in the embodiment in FIG. 2. Thus, the pilot chamber 14a comprises also in this case an outlet passage 14b directing coolant from the pilot chamber 14a to the thermostat chamber 15a. In this case, the outlet passage 14b is a through hole in a wall separating the pilot chamber 14a and the thermostat chamber 15a.

During operation of the combustion engine 2, the coolant is circulated through the cooling circuit by means of the coolant pump 3. The first capsule 31a is fixedly arranged in thermal contact with coolant in the pilot chamber 14a and the second capsule 32 is arranged in thermal contact with the coolant entering the thermostat chamber 15a via the inlet 7'. During operating conditions when the coolant in the pilot chamber 14a has a lower temperature than the first phase changing temperature $T_1$ and the coolant in the thermostat chamber 15a has a lower temperature than the second phase changing temperature $T_2$, the first material body 31b as well as the second material body 32b are in solid phase. Thus, none of the material bodies 31b, 32b is in an expanded state. The tubular sleeve 34 is maintained in the first end position in which the periphery wall 34a of the tubular sleeve 34 fully exposes the first outlet 9' at the same time as it closes the second outlet 10'. When the tubular sleeve 34 is in this first end position, the entire coolant flow entering the thermostat device 8 from the retarder outlet line 7 is directed to the radiator bypass line 9.

When the coolant in the pilot chamber 14a has a higher temperature than the first phase changing temperature $T_1$ and the coolant in the thermostat chamber 15a has a lower temperature than the second phase changing temperature $T_2$, the first material body 31a is in liquid phase and the second material body 32a is in solid phase. Thus, the first material body 31a is in an expanded state. During expansion of the first material body, it provides a first stroke, via the flexible membrane 31c and the shaft 31d, to the tubular sleeve 34. The expansion of the first material body 31c moves the tubular sleeve 34 to a first intermediate position, in which the first outlet 9'and the second outlet 10' are partly exposed by the periphery wall 34a of the tubular sleeve 34. When the tubular sleeve 34 is in this first intermediate position, a part of the coolant flow entering the thermostat device 8 is directed to the radiator bypass line 9 and a remaining part of the coolant flow is directed to the radiator 11.

When the coolant in the pilot chamber 14a has a lower temperature than the first phase changing temperature $T_1$ and the coolant in the thermostat chamber 15a has a higher temperature than the second phase changing temperature $T_2$, the first material body 31b is in solid phase and the second material body 32b is in liquid phase. Thus, the second material body 32b is in an expanded state. During expansion of the second material body 32b, it provides a second stroke, via the flexible membrane 32c and the piston 32d, to the tubular sleeve 34. The expansion of the second material body 32b moves the tubular sleeve 34 to a second intermediate position, in which the first valve plate 16 is in a partly open position in relation to the first valve seat 17 and the second valve plate 20 is in a partly open position in relation to the second valve seat 21. When the valve unit 24 is in this second intermediate position, a part of the coolant flow entering the thermostat device 8 is directed to the radiator bypass line 9 and a remaining part of the coolant flow is directed to the radiator 11.

When the coolant in the pilot chamber 14a has a higher temperature than the first phase changing temperature $T_1$ and the coolant in the thermostat chamber 15a has a higher temperature than the second phase changing temperature $T_2$, the first material body 31b as well as the second material body 32b are in liquid phase. Thus, the first material body 31b and second material body 32b are in an expanded state. During expansion of the first material body 31b and the second material body 32b, they each provide a stroke, via the pistons 31d, 32d, to the tubular sleeve 34. The expansion of the first material body 31b and the second material body 32b moves the tubular sleeve 34 to a second end position, in which the periphery wall 34a closes the first outlet 9' at the same time as it fully exposes the second outlet 10'. When the tubular sleeve 34 is in this second end position, the entire coolant flow entering the thermostat device 8 is directed to the radiator 11.

Figure 4:
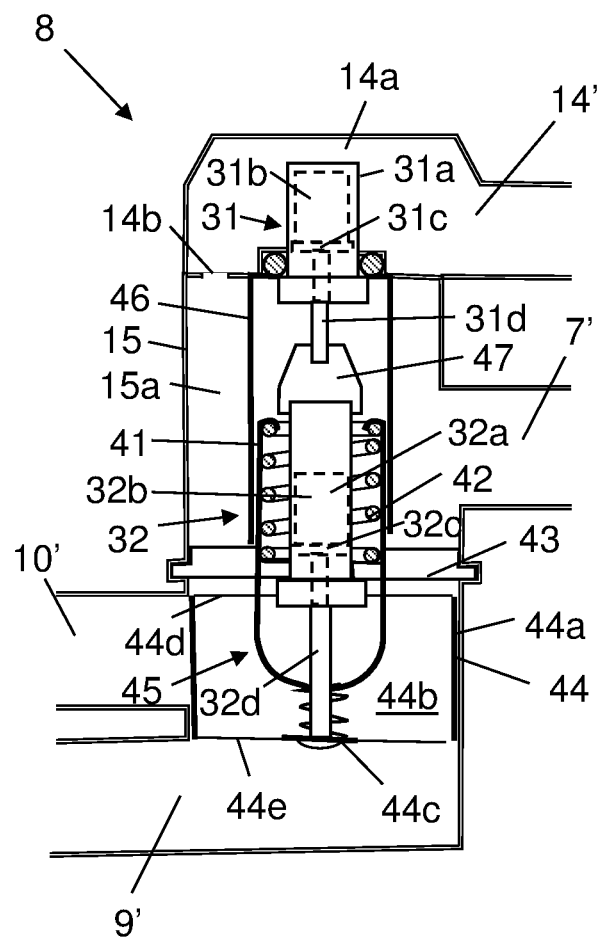

FIG. 4 shows a further alternative embodiment of the thermostat device 8. The thermostat device 8 comprises a first thermostat element 31 provided with a first capsule 31a fixedly arranged in the chamber 14c of the pilot circuit. The first thermostat element 31 comprises a first piston 31d connected to a second capsule 32a of a second thermostat element 32 via a connection member 47. Such a connection member 47 provides a stable connection between the first piston 31d and the second capsule 32a. The second thermostat element 32 comprises a second piston 32d fixedly connected to a spring holder 41. A valve spring 42 is arranged between the spring holder 41 and a stationary portion 43 in the valve housing 15.

The thermostat device 8 comprises a valve body in the form of a tubular sleeve 44. The tubular sleeve 44 comprises a periphery wall 44a defining an inner space 44b, a support portion 44c, an first opening 44d and a second opening 44e. The tubular sleeve 44 is connected to the piston 32d of the second thermal element 32 via the support portion 44c. The second thermal element 32, the spring holder 41, the valve spring 42, and the tubular sleeve 44 are included in a movable valve unit 45. A bracket 46 supports the first thermostat element 31 on the stationary portion 43. The pilot chamber 14a comprises an outlet passage 14b in form of a through hole directing coolant from the pilot chamber 14a to the thermostat chamber 15a.

During operation of the combustion engine 2, the coolant is circulated through the cooling circuit by means of the coolant pump 3. The first capsule 31a is fixedly arranged in thermal contact with coolant flowing through the pilot circuit 14 and the second capsule 32 is arranged on the tubular sleeve 44 in thermal contact with the coolant entering the valve housing 15 via the inlet 7'. During operating conditions when the coolant in the pilot chamber 14a has a lower temperature than the first phase changing temperature $T_1$ and the coolant in the thermostat chamber 15a has a lower temperature than the second phase changing temperature $T_2$, the first material body 31b as well as the second material body 32b are in solid phase. Thus, none of the material bodies 31b, 32b are in an expanded state. The tubular sleeve 34 is maintained in the first end position in which the periphery wall 44a of the tubular sleeve 44 fully exposes the first outlet 9' at the same time as it closes the second outlet 10'. When the tubular sleeve 44 is in this first end position, the entire coolant flow entering the thermostat device 8 from the retarder outlet line 7 is directed to the radiator bypass line 9.

When the coolant in the pilot chamber 14a has a higher temperature than the first phase changing temperature $T_1$ and the coolant in the thermostat chamber 15a has a lower temperature than the second phase changing temperature $T_2$, the first material body 31a is in liquid phase and the second material body 32a is in solid phase. Thus, the first material body 31a is in an expanded state. During expansion of the first material body, it provides a first stroke, via the flexible membrane 31c and the shaft 31d, to the tubular sleeve 44, via the second thermal element 32. The expansion of the first material body 31c moves the tubular sleeve 44 to a first intermediate position, in which the first outlet 9'and the second outlet 10' are partly exposed by the periphery wall 44a of the tubular sleeve 44. When the tubular sleeve 44 is in this first intermediate position, a part of the coolant flow entering the thermostat device 8 is directed to the radiator bypass line 9 and a remaining part of the coolant flow is directed to the radiator 11.

When the coolant in the pilot chamber 14a has a lower temperature than the first phase changing temperature $T_1$ and the coolant in the thermostat chamber 15a has a higher temperature than the second phase changing temperature $T_2$, the first material body 31b is in solid phase and the second material body 32b is in liquid phase. Thus, the second material body 32b is in an expanded state. During expansion of the second material body 32b, it provides a second stroke, via the flexible membrane 32c and the piston 32d, to the tubular sleeve 44. The expansion of the second material body 32b moves the tubular sleeve 44 to a second intermediate position, in which the first valve plate 16 is in a partly open position in relation to the first valve seat 17 and the second valve plate 20 is in a partly open position in relation to the second valve seat 21. When the valve unit 24 is in this second intermediate position, a part of the coolant flow entering the thermostat device 8 is directed to the radiator bypass line 9 and a remaining part of the coolant flow is directed to the radiator 11.

When the coolant in the pilot chamber 14a has a higher temperature than the first phase changing temperature $T_1$ and the coolant in the thermostat chamber 15a has a higher temperature than the second phase changing temperature $T_2$, the first material body 31b as well as the second material body 32b are in liquid phase. Thus, the first material body 31b and second material body 32b are in an expanded state. During expansion of the first material body 31b and the second material body 32b, they provide each a stroke, via the pistons 31d, 32d, to the tubular sleeve 44. The expansion of the first material body 31b and the second material body 32b moves the tubular sleeve 44 to a second end position, in which the periphery wall 44a closes the first outlet 9' at the same time as it fully exposes the second outlet 10'. When the tubular sleeve 44 is in this second end position, the entire coolant flow entering the thermostat device 8 is directed to the radiator 11.

In this case, the first thermostat element 31 and the second thermostat element 32 provide strokes in the same direction. Thus, the distance between the first capsule 31a and the second capsule 32a may increase with the first stroke and the distance between the second capsule 32a and the tubular sleeve 44 may increase with the second stroke. The above mentioned arrangement of the first thermostat element and the second thermostat, results in a stroke of the tubular sleeve 44 to a position defined by the sum of the strokes provided by the individual thermostat elements 31, 32.

The invention is not in any way limited to the embodiment that has been described in the drawings: it can be freely varied within the scope of the patent claims.

The invention claimed is:

1. A thermostat device for a cooling system comprising:
   at least one component configured to be cooled by a circulating coolant and the cooling system comprises a radiator in which the coolant is cooled;
   the thermostat device comprises a pilot chamber configured to receive coolant from a first position of the cooling system and comprises a thermostat chamber configured to receive coolant from a second position of the cooling system;
   a first outlet from the thermostat chamber and the first outlet is configured to direct coolant, via a bypass line, and past the radiator;
   a second outlet from the thermostat chamber and the second outlet is configured to direct coolant to the radiator;
   a movably arranged valve body located in the thermostat chamber and configured to distribute the coolant in the thermostat chamber to the first and second outlets in dependence on the position, of the valve body, wherein the valve body includes a stroke member;

the pilot chamber comprises an outlet passage located and configured to direct coolant from the pilot chamber to the thermostat chamber;

the thermostat device comprises a first sensor member arranged stationary in the thermostat device comprising a first thermal expansion element, the first thermal expansion element having a first phase changing temperature, located and configured to be in thermal contact with the coolant in the pilot chamber and the first thermal expansion element being connected to the valve body, configured and operable to provide a first stroke of the valve body to move the stroke member of the valve body in response to phase change of the first thermal expansion element due to a first temperature of the coolant in the pilot chamber; and a second sensor member connected to the stroke member comprising a second thermal expansion element that is movably arranged, the second thermal expansion element having a second phase changing temperature, located and configured to be in thermal contact with the coolant in the thermostat chamber and the second thermal expansion element being connected to the valve body, located, configured and operable to provide a second stroke of the valve body to move the valve body in response to phase change of the second thermal expansion element due to a second temperature of the coolant in the thermostat chamber such that the valve body is configured and movable to a position defined by both the first stroke from the first thermal expansion element and the second stroke from the second thermal expansion element, wherein the first phase changing temperature and the second phase changing temperature are different.

2. A thermostat device according to claim 1, wherein the stroke member is connected to both the first and second thermal expansion elements.

3. A thermostat device according to claim 1, further comprising the stroke member of the stationary arranged first thermal expansion element is connected to the second sensor member of the movably arranged second thermal expansion element and the stroke member of the movably arranged first thermal expansion element is connected to the valve body.

4. A thermostat device according to claim 3, further comprising a connection member connects the stroke member of the stationary arranged first thermal expansion element to the sensor member of the movably arranged second thermal expansion element.

5. A thermostat device according to claim 1, further comprising each thermal expansion element comprises a sensor member in the form of a capsule enclosing a material body and a material of the material body is configured to change a phase thereof at a specific temperature; and the stroke member in the form of a piston located and configured to provide the stroke of the valve body when the material of the body changes the phase thereof.

6. A thermostat device according to claim 1, further comprising the valve body is movably arranged between a first end position in which the valve body directs the entire coolant flow to the radiator bypass line, a second end position in which the valve body directs the entire coolant flow to the radiator, and at least one intermediate position in which the valve body directs a first part of the coolant flow to the radiator bypass line and a remaining part of the coolant flow to the radiator.

7. A thermostat device according to claim 6, further comprising the thermostat device comprises a valve spring located and configured to move the valve body towards the first end position.

8. A thermostat device according to claim 1, further comprising the movable valve body comprises a first valve plate configured to regulate the coolant flow to the radiator and a second valve plate configured to regulate the coolant flow to the radiator bypass line.

9. A thermostat device according to claim 1, further comprising the movable valve body comprises a tubular sleeve having a periphery wall located, configured and operable to expose or to cover the first and second outlets based on a position of the tubular sleeve at a respective time.

10. A cooling system, comprising a thermostat device according to claim 1.

11. A cooling system according to claim 10, further comprising a combustion engine and a temporarily activated one of the components.

12. A cooling system according to claim 11, further comprising the temporarily activated one of the components comprises a hydraulic retarder or a retarder cooler for a hydraulic retarder.

13. A thermostat device according to claim 1, wherein the first phase changing temperature is lower than the second phase changing temperature.

14. A thermostat device for a cooling system comprising:
at least one component configured to be cooled by a circulating coolant and the cooling system comprises a radiator in which the coolant is cooled;
the thermostat device comprises a pilot chamber configured to receive coolant from a first position of the cooling system and comprises a thermostat chamber configured to receive coolant from a second position of the cooling system;
a first outlet from the thermostat chamber and the first outlet is configured to direct coolant, via a bypass line, and past the radiator;
a second outlet from the thermostat chamber and the second outlet is configured to direct coolant to the radiator;
a movably arranged valve body located in the thermostat chamber and configured to distribute the coolant in the thermostat chamber to the first and second outlets in dependence on the position, of the valve body;
the pilot chamber comprises an outlet passage located and configured to direct coolant from the pilot chamber to the thermostat chamber;
the thermostat device comprising:
a first sensor member arranged stationary in the thermostat device comprising a first thermal expansion element having a first capsule that includes a closed compartment than is occupied by a first material body, the first thermal expansion element in thermal contact with the coolant in the pilot chamber, and the first thermal expansion element being operatively connected to the a first stroke member of the valve body to provide a first stroke of the valve body to move the first stroke member of the valve body in response to a first temperature of the coolant in the pilot chamber; and
a second sensor member connected to the first stroke member comprising a second thermal expansion element having a second capsule that includes a closed compartment than is occupied by a second material body, the second thermal expansion element in thermal contact with the coolant in the thermostat chamber and the second thermal expansion element being connected to a second stroke member of the valve body and operable to provide a second stroke of the valve body to move the second stroke member of the valve body in response to a second temperature of the coolant in the thermostat chamber; and wherein the first stroke member and the second stroke member are fixedly connected to each other such that the valve body is movable to a position defined by both the first stroke of the first thermal expansion element and the second stroke from the second thermal expansion element.

15. The thermostat device according to claim 14, wherein the first material body has a first phase changing temperature, and the second material body has a second phase changing temperature, and wherein the first phase changing temperature is different than the second phase changing temperature.

16. The thermostat device according to claim 15, wherein the first phase changing temperature is lower than the second phase changing temperature.

17. The thermostat device according to claim 14, wherein a flexible membrane is arranged between the first material body and the first stroke member.

* * * * *